Jan. 29, 1924.
M. L. ADAMS
1,482,282
BELT FASTENING HOOK
Filed April 14, 1922
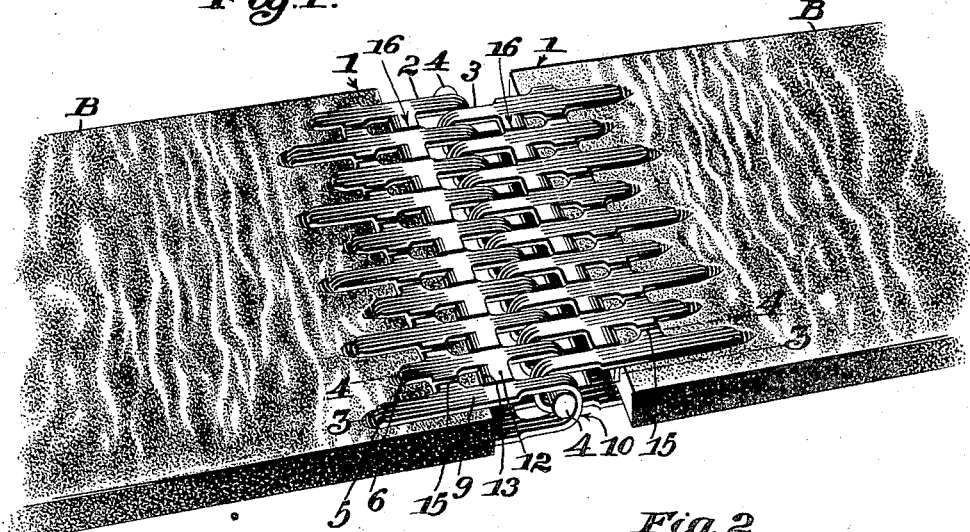
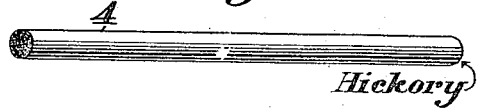
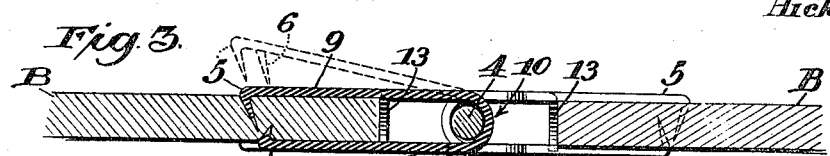
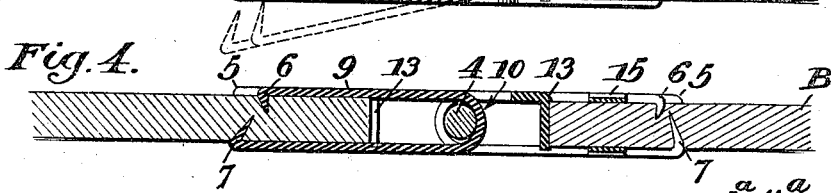
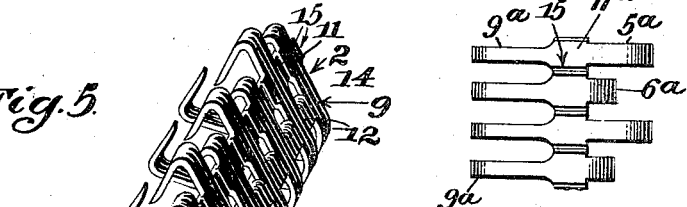
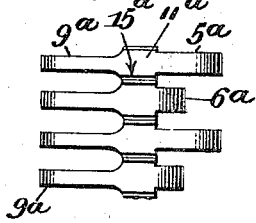
WITNESSES
J. P. Schrott
INVENTOR
Morton L. Adams.
BY
ATTORNEYS Patented Jan. 29, 1924.

1,482,282

UNITED STATES PATENT OFFICE.

MORTON L. ADAMS, OF ANCHORAGE, TERRITORY OF ALASKA.

BELT-FASTENING HOOK.

Application filed April 14, 1922. Serial No. 552,689.

*To all whom it may concern:*

Be it known that I, MORTON LEA ADAMS, a citizen of the United States, and a resident of Anchorage, Territory of Alaska, have invented certain new and useful Improvements in Belt-Fastening Hooks, of which the following is a specification.

My invention relates to improvements in belt hooks, and it consists of the construction, combination and arrangement herein described and claimed.

An object of the invention is to provide a hook for the purpose of fastening the ends of a belt together.

A further object of the invention is to provide a hook body which comprises a plurality of shanks, hooks and tangs all held together and in proper relationship by a binder, thereby making it easy to apply the hook body (one side of the hinge) to one end of a belt, either by hammering or putting the parts into a vise.

A further object of the invention is to provide a hook body comprising a plurality of members all held together by a binder which is weakened so that the hook body may be broken off into desired lengths.

A further object of the invention is to provide means to limit the distance at which the points or tangs of the hooks may be driven into the belt in from the edge, and thus preserve a uniform space for the hinge pin.

A further object of the invention is to provide a one-piece hook body which can be fixed in place at one end of a belt to form half of a connecting hinge, without the aid of a so-called lacing machine.

Other objects and advantages will appear in the following specification, reference being had to the accompanying drawing, in which:

Fig. 1 is a perspective view of the confronting ends of a belt, showing one of the improved hook bodies on the end of each to make the connecting hinge, Fig. 2 is a detail perspective view of the hickory pin, Fig. 3 is a detail section on the line 3—3 of Fig. 1, Fig. 4 is a similiar section on the line 4—4 of Fig. 1, Fig. 5 is a detail perspective view of the improved belt hook, and Fig. 6 is a detail plan view illustrating a slight modification.

The invention is for the purpose of fastening or "lacing" the ends 1 of a belt B together. It consists of a pair of hook bodies 2 and 3 which are fastened to the respective ends of the belt and in turn are connected by a pin 4. This pin makes a hinge joint of the two hook bodies, so that the belt may yield when traveling around a pulley.

As both hook bodies are precisely alike in construction, the description of one will suffice for both. By describing the invention as a "hook body" reference is made to the entire article or body 2 as it appears in Fig. 5. The hook body 2 is composed of a plurality of shanks 9 which are bent in the middle at 10 and held together by binders 11. Before application to the belt the hook body is of a substantial V-shape.

The respective ends of each shank that extend beyond the binders 11 are, for the purpose of distinction, referred to as hooks. The bent parts of the hooks are referred to as tangs. The hooks are alternately long and short. The long and short hooks in the series on one side have long and short tangs 5 and 6, the long and short hooks in the other series also having long and short tangs 7 and 8.

It is to be observed that a long tang and hook on one side confronts a short tang and hook on the other side. For example, the long hook and tang 5 confront the short hook and tang 8. This arrangement is necessary to permit the tangs to pass when driven or otherwise forced into the belt as shown in Figure 3.

The hook body is stamped out of one piece of material. This stamping includes a bridge 12 which carries a plurality of lugs 13 for the purpose of abutting the end of the belt (Figs. 3 and 4) to limit the distance at which the hooks shall extend over the belt from the end.

Obviously the bridge 12 is also a part of the sheet of metal from which the hook body is stamped. The lugs 13 are stamped out at 14 and bent down into the desired positions. In actual practice, the hook body 2 will be made approximately eight inches long, although the original length may vary according to requirements. The binder 11 is weakened at 15 between each of the hooks and shanks 9, so that any desired length of the belt hook body can be broken off. Figure 1 shows the bridge 12 to be similarly weakened at 16 because it will be necessary to break the bridge as well as the binder when separating the hook body. Obviously these weakened places occur on both sides of the hook body. The weakened places may be formed by stamping or scoring grooves into the metal either adjacent to the hook shanks as in the case of the places 16 (Fig. 1), or in the center between the hook shanks as in the case of the places 15 on the binders 11.

Figure 6 discloses a slight modification wherein the bridge 12 with its pendent lugs 13 is omitted. The shanks 9ª merge with the long and short hooks and tangs 5ª and 6ª, the binder 11ª connecting all together. The binder is weakened at 15ª as before. An obvious advantage of this integral hook body is that no so-called "lacing machine" is required in order to apply the hook body to the end of a belt. The hook body is sold in the open triangular shape shown in Figure 5, and all that the operator requires to do is to fit the open end of the hook body over the end of the belt until it meets the lugs 13, whereupon the long and short hooks and tangs may either be hammered into the belt or the whole structure inserted into a vise and clamped in position by screwing the jaw down.

It is to be observed that the lugs 13 (Fig. 5) come opposite to the spaces between parts of the shanks 9 on the other side of the hook body. Although this is a feature incidental to the manufacture of the hook body, nevertheless it has an advantage in making room for the ends of the lugs should they happen to be a little longer than the belt is thick, (see Fig. 4).

The pin 4, by means of which the parts of the belt are hinged together, is intended to be made of white hickory wood, boiled in oil to give it water-resisting qualities. The hickory wood is believed to be superior to the material of which hinge pins for this purpose are usually made (for example, raw hide, bamboo, etc.) since it is inherently tough and capable of withstanding considerable wear.

I claim:—

1. Belt lacing means comprising two hook bodies each with tangs to be forced into a belt adjacent to the ends when the hook bodies are pressed together on the confronting ends of a belt, and an oiled wooden pin fitted through interlocking parts of said hook bodies to form a hinge.

2. Belt fastening means comprising a series of hooks of which each has confronting long and short tangs adapted to pass when forced into the belt, and means connecting the hooks to make an integral hook body.

3. Belt fastening means comprising a hook body composed of a series of hook shanks disposed at angles to each other in readiness to receive the end of a belt, long and short confronting tangs formed at the ends of each hook, means by which the hook shanks are connected to make an integral hook body, the hook portions of the shanks alternately extending at greater distances from said means to enable the tangs to pass when forced into the belt, and other shank connecting means including means to be abutted by the belt end to limit its insertion.

4. Belt fastening means comprising a hook body composed of a series of hook shanks disposed at angles to each other in readiness to receive the end of a belt, the hook ends of the shanks at each side of the body being alternately long and short, a long hook on one side confronting a short hook on the other; long tangs formed on the long hooks, short tangs formed on the short hooks, means to connect the hook shanks to form an integral body and being scored to facilitate breaking, and other connecting means also scored having abutments bent toward the interior of the hook body to limit the insertion of the belt end.

5. Belt fastening means comprising a hook body consisting of two diverging sides providing an entrance for a belt end and joined by a knuckle-forming portion, a plurality of members of which the sides and said portion are composed, hooks and tangs on the ends of each member respectively made long and short to more readily pass when the two sides are forced upon the belt, connecting means for said members having weakened places to facilitate breaking the hook body where required, and means embodied in certain ones of the connecting means providing abutments for the belt end to prevent it from entering the knuckle-forming portion.

6. Belt lacing means comprising a hook body formed into a substantial V-shape to provide a knuckle composed of a series of shanks having each end bent into confronting hooks and tangs, binders connecting the hook shanks adjacent to each series of hooks having scored places running with the hooks and shanks, a bridge also connecting the shanks having attached lugs stamped out from between the shanks and bent inward to provide belt-end abutments ahead of said knuckle, the bridge having scored places running substantially with one edge of each shank, the scored places permitting breaking off any length of hook body.

MORTON L. ADAMS.